(12) United States Patent
Wang et al.

(10) Patent No.: US 10,791,474 B2
(45) Date of Patent: Sep. 29, 2020

(54) LICENSED ASSISTED ACCESS SIGNAL DETECTION FOR REDUCING POWER USE

(71) Applicant: Apple Inc., Cupertino, CA (US)

(72) Inventors: Beibei Wang, Cupertino, CA (US); Zhu Ji, San Jose, CA (US); Johnson O. Sebeni, Fremont, CA (US); Jia Tang, San Jose, CA (US); Yang Li, Plano, TX (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/124,651

(22) Filed: Sep. 7, 2018

(65) Prior Publication Data

US 2020/0084650 A1   Mar. 12, 2020

(51) Int. Cl.
| | |
|---|---|
| *H04W 4/00* | (2018.01) |
| *H04W 24/10* | (2009.01) |
| *H04L 5/00* | (2006.01) |
| *H04W 72/08* | (2009.01) |
| *H04W 72/04* | (2009.01) |
| *H04W 48/16* | (2009.01) |

(52) U.S. Cl.
CPC .......... *H04W 24/10* (2013.01); *H04L 5/0048* (2013.01); *H04W 48/16* (2013.01); *H04W 72/0446* (2013.01); *H04W 72/085* (2013.01)

(58) Field of Classification Search
USPC ..... 370/395.4, 462, 232, 329, 401, 467, 468
See application file for complete search history.

(56) References Cited

U.S. PATENT DOCUMENTS

| | | | |
|---|---|---|---|
| 9,408,130 B1 * | 8/2016 | Kotreka | ................ H04W 76/38 |
| 9,565,568 B2 | 2/2017 | Suzuki | |
| 2017/0214519 A1 | 7/2017 | Park | |
| 2017/0265248 A1 | 9/2017 | Narasimha | |
| 2017/0346647 A1 | 11/2017 | Huang | |

FOREIGN PATENT DOCUMENTS

WO   WO-2014068532 A1 *   5/2014   ........... H04L 1/0026

* cited by examiner

*Primary Examiner* — Phuongchau Ba Nguyen
(74) *Attorney, Agent, or Firm* — Kowert, Hood, Munyon, Rankin & Goetzel, P.C.

(57) ABSTRACT

This disclosure relates to techniques for detecting a signal and powering off at least some receiver components if no signal is detected. A wireless device may take one or more measurements of one or more signals. The wireless device may determine, based on the measurements, whether a signal (e.g., a signal of a licensed assisted access cell) is anticipated during an upcoming time period, e.g., a subframe or portion of a subframe. If no signal is anticipated, the wireless device may power off at least some receiver functions.

20 Claims, 7 Drawing Sheets $$\sum_{m=0}^{1} \left( \frac{\sum_{k=0}^{2N_{prb}-2} X_m(6k+i) X_m^*(6k+i+6)}{\sum_{k=0}^{2N_{prb}-2} |X_m(6k+i)|^2} + \frac{\sum_{k=0}^{2N_{prb}-3} X_m(6k+i) X_m^*(6k+i+12)}{\sum_{k=0}^{2N_{prb}-3} |X_m(6k+i)|^2} \right)$$

| | Description | Early Rx OFF at Symbol | Total Rx OFF at Symbols |
|---|---|---|---|
| Scenario 1 | Collision with DMTC window, previous SF has DL grant | 7 | 7 |
| Scenario 2 | Collision with DMTC window, previous SF has no DL grant | 6 | 8 |
| Scenario 3 | No Collision with DMTC window, previous SF has DL grant | 6 | 8 |
| Scenario 4 | No Collision with DMTC window, previous SF has no DL grant | 5 | 9 |

FIG. 9

$$\sum_{m=0}^{1} \left( \sum_{k=0}^{2N_{prb}-2} X_m(6k+i) X_m^*(6k+i+6) \right) / \left( \sum_{k=0}^{2N_{prb}-2} |X_m(6k+i)|^2 \right)$$

FIG. 10

LICENSED ASSISTED ACCESS SIGNAL DETECTION FOR REDUCING POWER USE

TECHNICAL FIELD

The present application relates to wireless communication, including methods, systems, and apparatuses to reduce power consumption.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of cellular networks may increasingly include licensed assisted access (LAA). LAA cells may not transmit in all subframes, however mobile electronic devices may use power to detect transmissions. Therefore, improvements in the field are desired.

SUMMARY

Embodiments are presented herein of, inter alia, systems, apparatuses, and methods for performing cell set based mobility as part of wireless communications.

As noted above, the number of use cases wireless devices is growing, including use of licensed assisted access (LAA) cells. LAA cells may not transmit any signal during some time periods, however legacy devices may continue to receive during such time periods. This disclosure presents techniques for a wireless device to reduce power consumption based on signal detection. A wireless device may detect whether a signal is expected so that the wireless device may shut off radio components during time periods when no signal is expected. Thus, the wireless device may reduce power use by reducing the amount of time that radio components are active.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 9 is a table illustrating exemplary use cases, according to some embodiments; and FIG. 10 is an equation illustrating exemplary detection techniques, according to some embodiments.

Figure 1:
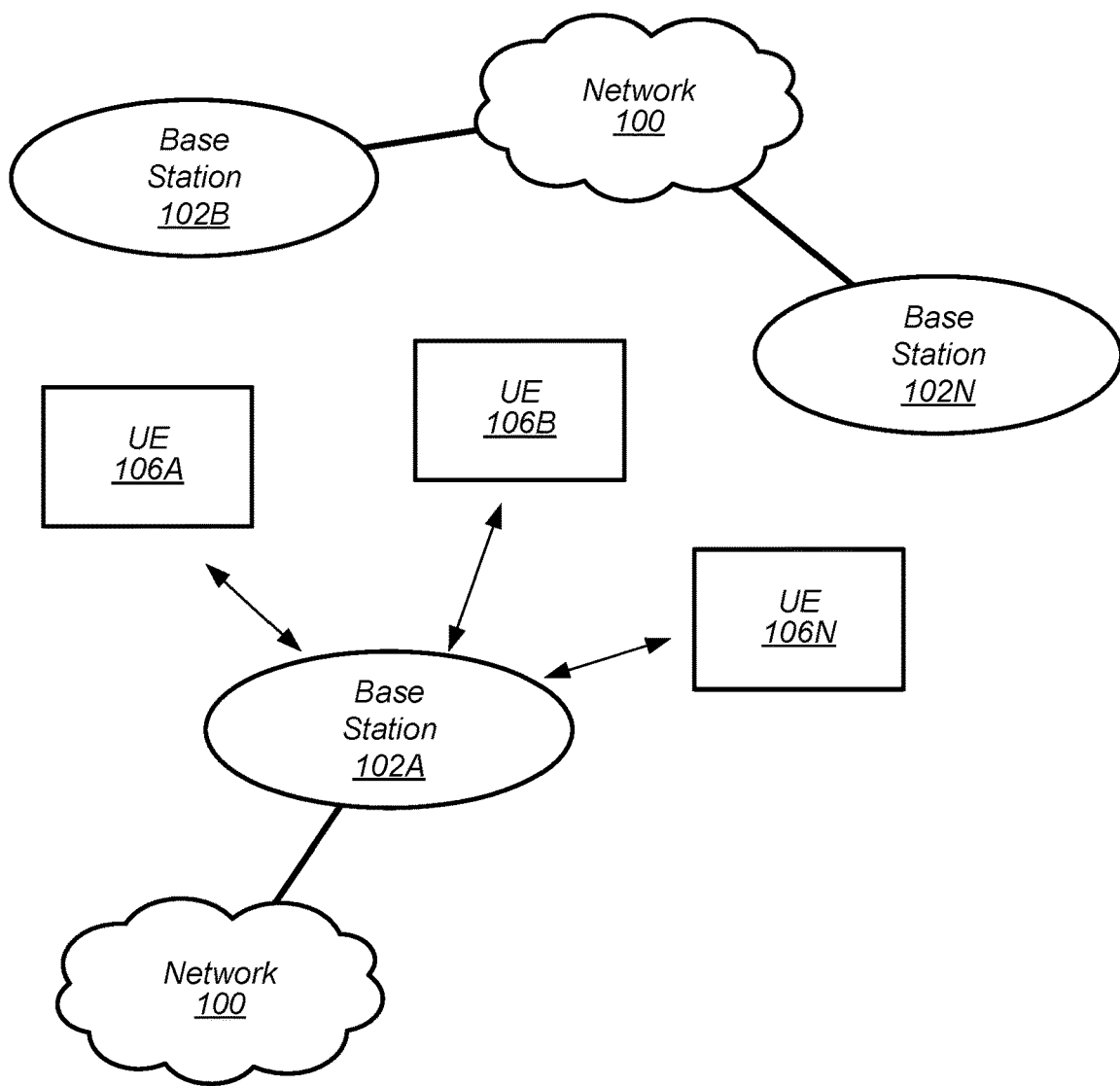
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity AS: access stratum
NAS: non-access stratum
RAT: radio access technology
PLMN: public land mobile network
LAA: licensed assisted access
DRS: discovery reference signal
DMTC: DRS measurement timing configuration
CRS: cell reference signal
PSS: primary sounding signal
SSS: secondary sounding signal
Rx: receiver
IRX: internal receiver
ORX: out receiver
PDCCH: physical downlink control channel
PDSCH: physical downlink shared channel
PRB: physical resource block
DCI: downlink control information
SNR: signal-noise ratio
RSRP: reference signal received power
SF: subframe Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
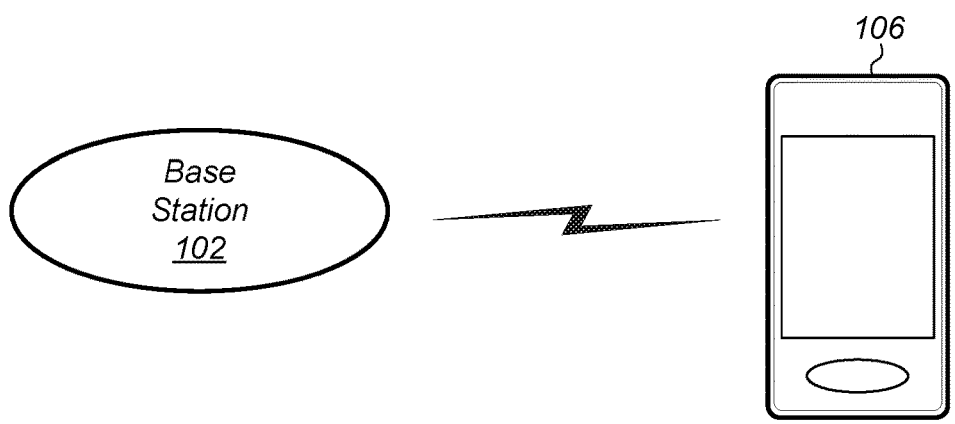
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
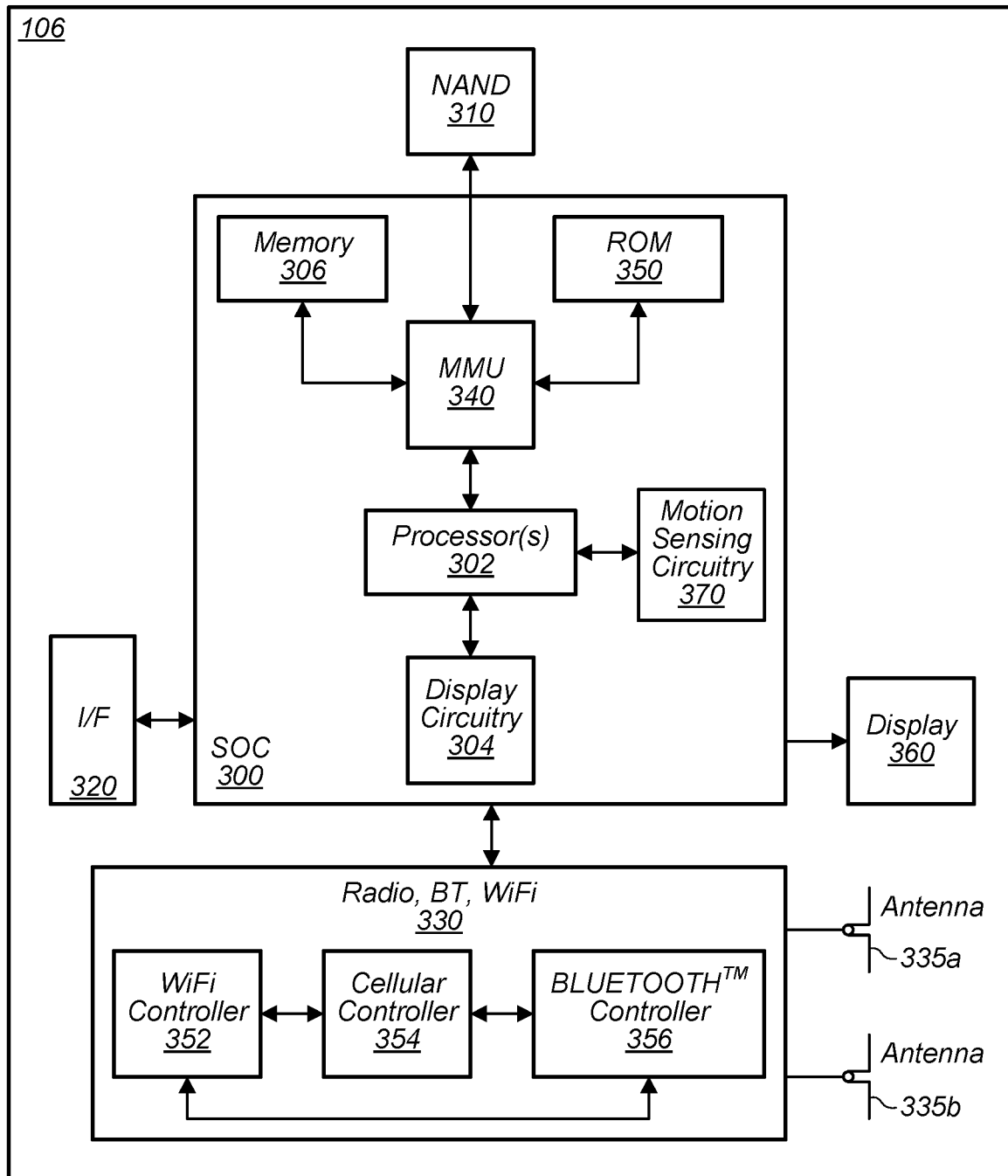
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
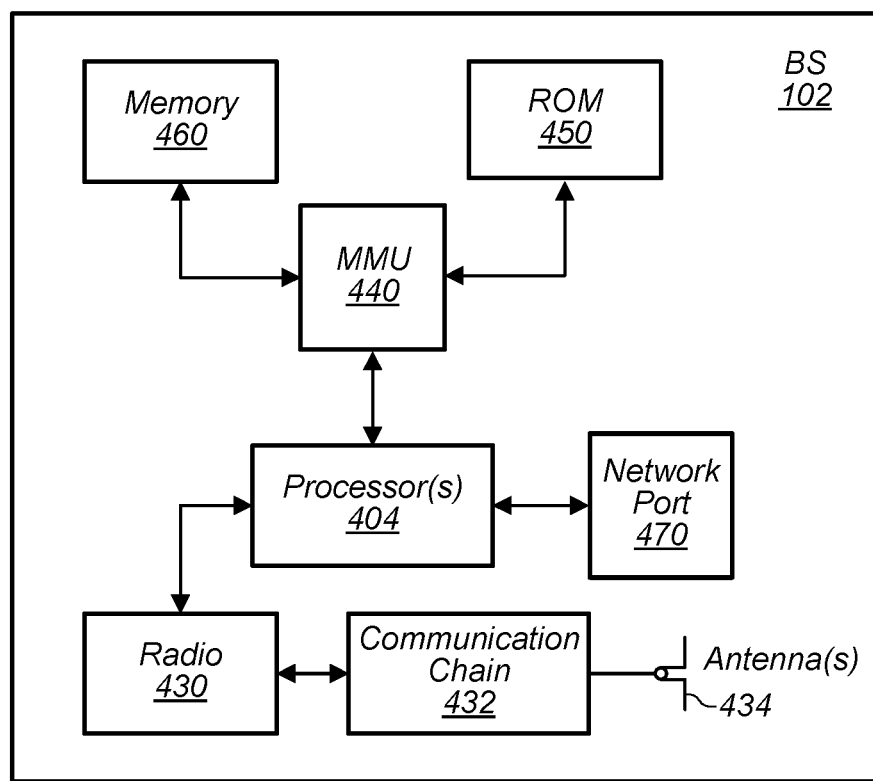
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s)

434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

The BS 102 may be an eNodeB (eNB) or gNodeB (gNB), according to some embodiments.

Figure 5:
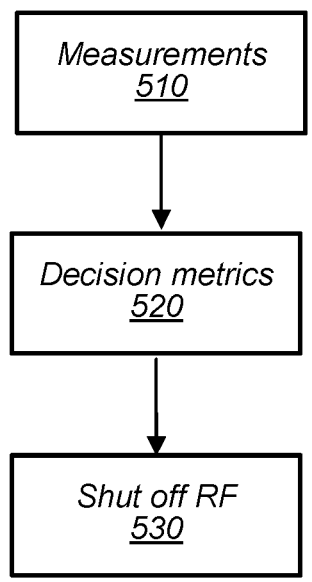
FIG. 5 is a flow chart diagram illustrating an exemplary method for power reduction based on signal detection, according to some embodiments.

FIG. 5—Communication Flow Diagram

5G New Radio (NR) and LTE may increasingly include a variety of cell types, e.g., including licensed and/or unlicensed spectrum. For example, licensed assisted access (LAA) cells may be increasingly common. Note that an LAA cell may aggregate licensed and unlicensed spectrum of a radio access network, e.g., at a media access control level, among various possibilities. For example, an LAA cell (e.g., a special type of secondary cell or SCell) may operate in an unlicensed band and may be assisted by an LTE cell (e.g., a primary cell or PCell) that may operate in a licensed band.

Unlike legacy LTE cells (e.g., operating in licensed spectrum) which may consistently transmit reference signals (e.g., cell-specific reference signals (CRS), PSS, SSS, etc.) in each subframe (e.g., regardless of whether the LTE cell has data to transmit), an LAA cell may not transmit reference signals under some circumstances. For example, outside of a discovery reference signal (DRS) measurement timing configuration (DMTC) window, a LAA cell may choose not to transmit any signal when LAA cell has no data to transmit. In a subframe during which an LAA cell transmits data (e.g., LTE data) on unlicensed frequency, reference signals may also be transmitted on unlicensed frequency (e.g., as in LTE cells in licensed frequency bands). An LAA cell may seek to avoid unnecessary conflicts with other uses of unlicensed frequency (e.g., Wi-Fi, Bluetooth, etc.).

A discovery window, such as a DMTC window may be configured as desired (e.g., configuration may be carrier-specific). For example, a DMTC window may be a 6 ms window during which all cells on a given carrier are configured to transmit DRS. During a subframe that collides with a discovery window, the LAA cell may transmit reference signals, e.g., DRS, on unlicensed spectrum. DRS may be similar to CRS and may be transmitted in time/frequency resources associated with discovery (e.g., as configured by the network for the DMTC window). Thus, during a discovery window, a UE may demodulate reference signals. For example, a UE may demodulate DRS/CRS which may be scrambled by subframe 0 (e.g., for regular subframe locations 0-4) or subframe 5 (e.g., for regular subframe locations 5-9) in order to accommodate possible DRS/CRS subframe shift.

In some embodiments, a UE may keep its receiver functions/components (e.g., Rx) powered on during an LAA signal detection period. A UE may actively track potential signal (e.g., grants) from an LAA cell. During this period, the UE may try to demodulate and decode PDCCH, according to some embodiments. This behavior may result in power use for Rx (e.g., for demodulation and/or decoding) when no LAA signal is present. Accordingly, it may be advantageous to determine whether an LAA signal is present and to power off at least some Rx components/functions when no LAA signal is anticipated (e.g., an empty subframe). For example, such techniques may allow for Rx to be shut off at symbol 5-7 in subframes when the UE detects an empty subframe (e.g., with sufficiently high confidence).

FIG. 5 is a flow chart diagram illustrating a method for detecting signals and powering off at least some Rx functions, according to some embodiments. The method of FIG. 5 may provide power savings, e.g., reducing the amount of time that Rx functions are active and avoiding receiving when no signal (e.g., LAA) may be present, according to some embodiments. For example, the method of FIG. 5 may enable the UE to minimize power use to receive during subframes in which no signal may be detected.

In various embodiments, some of the elements of the method shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B and/or BS 102 illustrated in and described with respect to FIGS. 1-4, or more generally in conjunction with any of the computer systems or devices shown in the Figures, among other devices, as desired. Note that while at least some elements of the method of FIG. 5 are described in a manner relating to the use of communication techniques and/or features associated with 3GPP specification documents, such description is not intended to be limiting to the disclosure, and aspects of the method of FIG. 5 may be used in any suitable wireless communication system, as desired. For example, although aspects of the method of FIG. 5 are described relating to LAA cells, it should be noted that the method may apply to other types of cells or wireless networks and other types of aggregation. As shown, the method may operate as follows.

A wireless device (e.g., UE 106) may perform measurements of one or more signals transmitted by one or more base stations (e.g., BS 102) (510). The UE and the BS may communicate using one or more radio access technologies, e.g., NR. The UE and BS may exchange application and/or control data in the uplink and/or downlink directions. The communication and measurements may occur on any frequency or combination of frequencies, e.g., including licensed and/or unlicensed spectrum. The communication and measurements may continue (e.g., periodically, randomly, as needed, etc.) for any amount of time. For example, the communication and measurements may occur over any number of subframes and/or symbols. The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values, comparison results, etc. to each other and/or to the network at any time.

In some embodiments, the UE may measure and record SNR and RSRP of an LAA cell over any number of time intervals (e.g., subframes); these measurements may be referred to as baseline measurements. The SNR and RSRP of the LAA cell in previous non-empty time intervals may be useful to the UE for determining whether/when to turn of Rx features in a current time interval. For example, the UE may calculate averages (e.g., moving averages, possibly weighted based on time) of SNR and RSRP over a number of subframes. The number of subframes may be limited to a number of most recent non-empty subframes; empty subframes may be excluded. The UE may use any of various other statistics instead of or in addition to averaging, e.g., the UE may calculate median or other percentile, standard deviation, variance, range, etc. Such measurements and statistics may establish a baseline for the signal characteristics of a cell when transmissions occur, e.g., during non-empty time intervals. Note that other measurements may be used in addition to or instead of SNR and/or RSRP, e.g., SINR and/or RSRQ may be used, among various possibilities. In some embodiments, only a single measurement (e.g., only SNR or only RSRP) may be used. The RSRP may be measured and recorded for CRS, DRS, and/or any other reference signals.

In some embodiments, the UE may measure RSRP of a current time interval, e.g., subframe. These measurements may be referred to as current interval measurements. For example, the UE may measure the RSRP of the CRS and/or DRS (or any other reference signals, e.g., PSS, SSS). Such reference signals may be scheduled relatively early in the time interval, such as in symbol 0 of a subframe, among various possibilities. Thus, by determining that a reference signal is not (or is) present, the UE may be able to infer that the time interval is (or is not) empty and may (or may not) be able to power off Rx functions.

In some embodiments, the UE may measure the RSRP of CRS as current interval measurements. CRS may be present during any time interval that the cell transmits data. To measure CRS (e.g., to detect an LTE signal), the UE may assume that CRS is scrambled using information from the current time interval (e.g., a current subframe number/information). For example, CRS may be scheduled (e.g., if data is to be transmitted) during symbol 0 of a subframe.

In some embodiments, the UE may also measure DRS as current interval measurements, e.g., within a discovery window. To measure DRS (e.g., within a DMTC window), the UE may assume that CRS is scrambled by subframe 0 (e.g., for subframes n=0-4) or by subframe 5 (e.g., for subframes n=5-9). The UE may assume another scrambling subframe/symbol/time, e.g., according to an RS shift of the cell.

The RSRP (e.g., of CRS and/or of DRS) may be used by the UE to determine whether the current time interval is empty, e.g., to determine whether LAA signal is anticipated during the remainder of the subframe. Note that other measurements may be used in addition to or instead of RSRP, e.g., RSRQ may be used, among various possibilities. The measurements may be taken for any port or ports containing reference signals.

The baseline and/or current interval measurements may be taken over the entire bandwidth used for transmissions from the cell (e.g., BS) to the UE. Any number of physical resource blocks (PRBs), subcarriers, channels, subchannels, etc., may be included.

The wireless device (e.g., UE 106) may apply decision metrics to determine whether or not a current time interval is empty, e.g., to determine if a signal is anticipated in the remainder of the time interval (520). The decision metrics (e.g., detection metrics) may use any measurement or combination of measurements and may compare the measurements to one or more thresholds. For example, the decision metrics may use the RSRP of the current time interval and the baseline RSRP and/or SNR of one or more recent (e.g., non-empty) time intervals.

Figures 6, 7:
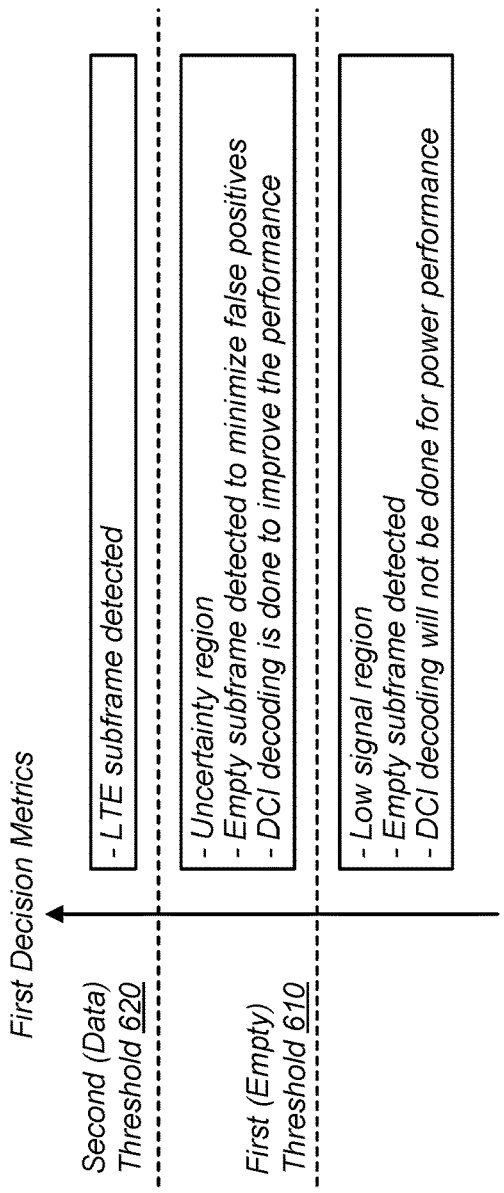
FIG. 6 is a block diagram illustrating signal detection, according to some embodiments.
FIG. 7 is an equation illustrating exemplary detection techniques, according to some embodiments.
Figure 8:
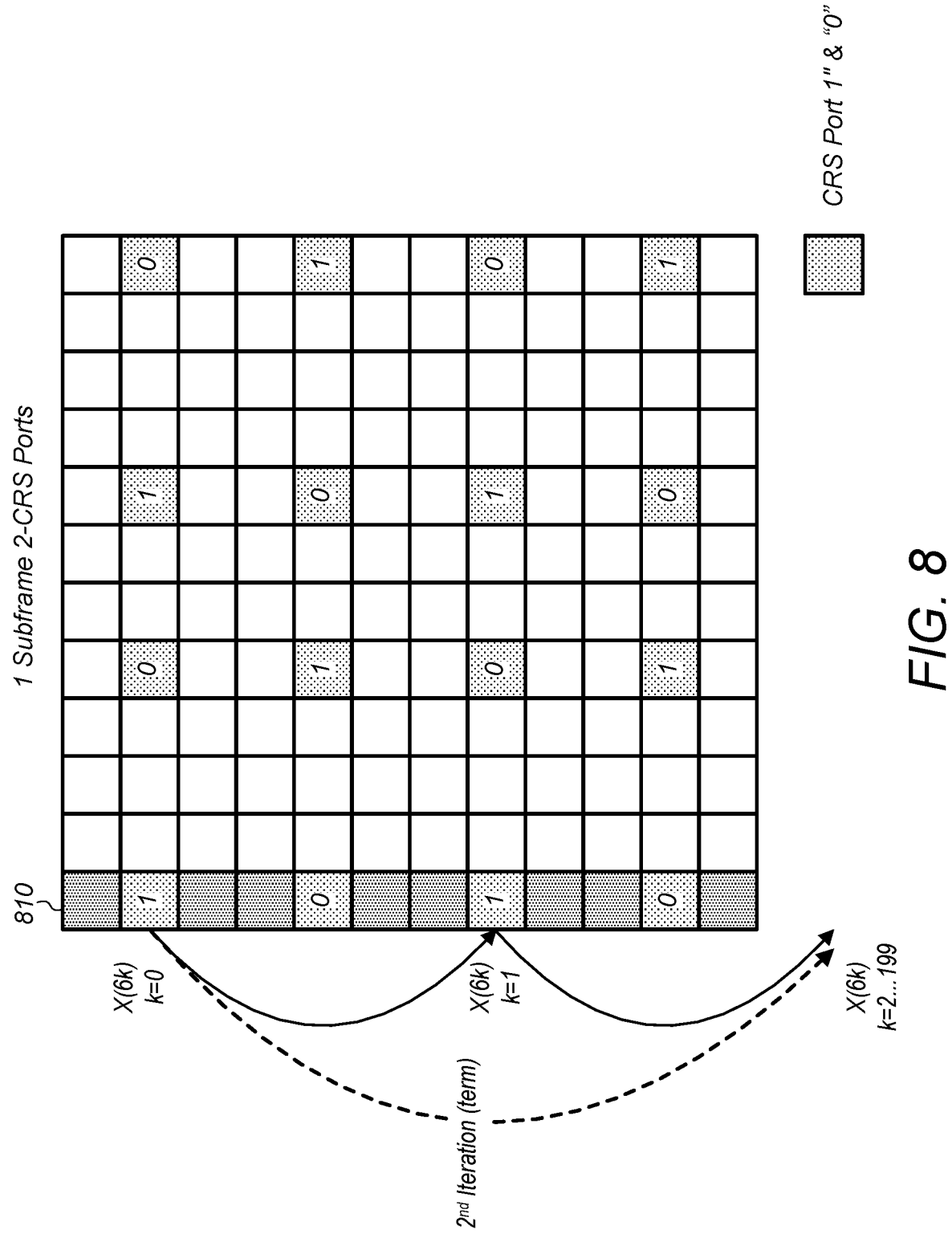
FIG. 8 is a block diagram illustrating exemplary detection techniques, according to some embodiments.

A first decision metric may be calculated based on the RSRP (e.g., and/or other measurements, as described above) of the current time interval (current interval measurements). The first decision metric may be calculated separately for CRS and DRS (e.g., DRS may be used if the current time interval collides with or overlaps with a discovery window). In some embodiments, a combined first decision metric (e.g., based on both CRS and DRS) may be calculated. FIGS. 7, 8, and 10, described below, provide more detail on the calculation of such a first decision metric.

This first decision metric may be compared to a first threshold (e.g., a threshold value that indicates the time interval is empty or "empty threshold"). If the value of the first decision metric is below the empty threshold, the UE may determine that the current time interval is empty, e.g., that no LAA signal is anticipated during the current subframe. The first decision metric being below the empty threshold may indicate that the signal energy (e.g., of the reference signal, e.g., CRS or DRS) is low. In other words, the UE may not detect an RS, e.g., in symbol 0 of the current subframe.

In some embodiments, if the first decision metric is above the first/empty threshold, this first decision metric may also be compared to a second threshold (e.g., a threshold that indicates that the time interval includes data via LTE, NR, etc. or a "data threshold"). If the value of the first decision metric is above the second/data threshold, the UE may determine that the current time interval is not empty, e.g., that an LAA signal is anticipated during the current subframe. If the first decision metric is between the first and second thresholds, the decision metric may be considered to be in an uncertainty region. In other words, the current time interval may be empty, however the measurements may not provide sufficient confidence. Accordingly, the UE may treat the uncertainty region similarly to the region above the second threshold, e.g., the UE may act as if the current interval is not empty and may continue to keep Rx functions/ circuitry active, according to some embodiments. Thus, the UE may seek to avoid false positives (e.g., wrongly determining an empty time interval) by using the second threshold.

Respective second and third decision metrics may be calculated based on baseline measurements of SNR and RSRP of recent (e.g., non-empty) time intervals. Note that alternative or additional measurements may also be used, as described above. In some embodiments, the baseline measurements may be based on a fixed or variable number of previous time intervals, excluding the current time interval. For example, in a current subframe number 101, the recent time intervals may include subframes 50-100 or 0-100, among various possibilities. Thus, the baseline measurements may be based on all of the non-empty subframes in the such a range.

The UE may compare the baseline measurements of SNR and RSRP to respective weak signal thresholds. If the measurements (e.g., RSRP and/or SNR of recent, non-empty time intervals) is below respective RSRP and/or SNR weak signal thresholds, the UE may determine that the first decision metric may not be able to accurately determine whether the time interval is empty. In other words, if recent measurements (e.g., of the same cell) suggest that the signal is too weak (e.g., and/or too much interference/noise is present), the first decision metric may be low (e.g., below the empty threshold) simply because of weak signal or high noise levels. Therefore, the UE may seek to avoid false positives (e.g., wrongly determining an empty time interval) by treating the time interval as non-empty (e.g., even if the first decision metric is below the first/empty threshold).

In some embodiments, the UE may adjust the thresholds for the decision metrics over time and/or based on other information. In other words, the UE may retain data on the levels of the decision metrics and whether a time interval is empty. Based on such retained data, the UE may calibrate the thresholds over time. For example, a UE may use such retained data to narrow the uncertainty region, e.g., to more precisely determine the values that indicate a non-empty vs. empty time interval. Thus, the UE may adjust the first and second thresholds for use in future time intervals. Further, such retained data may include and consider other factors, such as motion/orientation of the UE, location of the UE, cell identification, network identity, time of day, day of week, etc. For example, the UE may consider past history with a certain cell (or location) in evaluating the second decision metric. In other words, the UE may consider past determinations of empty/non-empty frames for a specific LAA cell and may adjust the weak signal threshold and/or the first/second thresholds of the first decision metric based on that history. Thus, in some embodiments, the described thresholds may be automatically or dynamically adjusted. Further, the UE may set or adjust the first/empty and second/data thresholds based on the baseline measurements. In other words, in some embodiments, the UE may use the baseline measurements to set thresholds for use in comparing the current time interval measurements (e.g., via first decision metrics) and may thus not perform a comparison of the baseline measurements to weak signal thresholds.

The wireless device (e.g., UE 106) may determine to power off some or all Rx functions, components, and/or circuitry based at least in part on the decision metrics (530). The UE may consider the first, second, and third decision metrics (and/or additional/alternative metrics) together. The UE may further consider trigger conditions specific to the time interval. For example, the UE may consider the first decision metric in terms of CRS if the current time interval does not collide with a discovery window. However, if the current time interval does collide with (e.g., overlap with or coincide with) a discovery window, the UE may consider the first decision metric both in terms of CRS and DRS. In other words, if the current time interval is outside of a discovery window, the UE may not anticipate DRS and may only measure CRS. Thus, the UE may only calculate the first decision metric based on CRS. If the current time interval collides with a discovery window, the UE may anticipate both CRS and DRS, may measure both CRS and DRS, and may compare the first decision metric based on CRS and the first decision metric based on DRS to the empty threshold. In some embodiments, the empty threshold applied to CRS may be the same as the empty threshold applied to DRS. In other embodiments, different empty thresholds for CRS and DRS may be applied.

In some embodiments, the trigger condition to turn off Rx may be summarized as follows. In a time interval that does not collide with a discovery interval, Rx may be turned off early if: 1) first decision metrics for CRS of a current interval are below the first (e.g., empty) threshold and 2) the second and/or third decision metrics of recent time intervals (e.g., baseline measurements) exceed respective weak signal thresholds. If either of these trigger conditions is not met, the UE may determine that the time interval is not empty (e.g., or there is not sufficient confidence that the interval is empty) and may thus determine to leave Rx powered on. In a time interval that does collide with a discovery interval, Rx may be turned off early if: 1) first decision metrics for CRS of a current interval are below the first (e.g., empty) threshold, 2) the second and/or third decision metrics of recent time intervals (e.g., baseline measurements) exceed respective weak signal thresholds, and 3) first decision metrics for DRS are below the first (e.g., empty) threshold. Again, if any of these conditions is not met, the UE may leave Rx powered on. It should be noted that other trigger conditions or combinations may be used. For example, either the second or the third decision metrics exceeding the respective weak signal thresholds may be sufficient (e.g., in combination with the first decision metrics for CRS and/or DRS below the first threshold).

In some embodiments, some of the trigger conditions summarized above may be omitted. For example, the comparison of baseline measurements and weak signal thresholds may not be used as a separate trigger condition, according to some embodiments. Instead, the baseline measurements may be used to set/adjust the first/empty threshold. Thus, comparison of the current time interval measurements (of CRS and/or DRS) to the first empty threshold(s) may be the only comparison performed and may be the only trigger condition.

In some embodiments, the UE may power off the Rx based at least in part on other information. For example, the UE may consider scheduling information received from the network such as a downlink grant (e.g., PDSCH) received in a current and/or a previous time interval (e.g., over PDCCH). Similarly, the UE may consider any indication from a network that LAA signals would or would not be transmitted during the current time interval.

In some embodiments, in response to determining that the current time interval is empty, the UE may power off any or all Rx functions, components or circuitry. For example, the UE may power off any or all of receiver chains, one or more antennas, one or more radios, baseband circuitry, radio frequency circuitry, one or more controllers, one or more processors, etc. The UE may power of Rx functions, components, or circuitry for use with one or more frequency ranges (e.g., unlicensed spectrum). The UE may power off Rx as soon as possible following the determination in order to achieve the greatest energy saving benefit. The timing of powering off Rx may vary based on whether a downlink grant was detected in a previous time interval, whether the current interval collides with a discovery window, and/or other factors. The UE may power off Rx for the remainder of the current time interval. It should be noted that the Rx may be powered back on for a subsequent time interval. In some embodiments, the Rx may remain powered off for one or more subsequent time intervals.

The method of FIG. 5 may be applied to any number of time intervals. The UE may determine that some intervals are empty and therefore turn of Rx for these intervals. For other intervals, the UE may determine that there is not sufficient confidence that they are empty (e.g., that they are not empty) and may leave Rx on for these other intervals.

FIGS. 6-10 and the following additional information are provided as being illustrative of further considerations and possible implementation details relating to the method of FIG. 5 and are not intended to be limiting to the disclosure as a whole. Numerous variations and alternatives to the details provided herein below are possible and should be considered within the scope of the disclosure.

FIGS. 6-8—Signal Detection

FIG. 6 illustrates various levels of the first decision metrics. As shown, below the first (e.g., empty) threshold may be considered a low signal region based on a low value of the first decision metrics. For example, RSRP of CRS or DRS may be low. Below the first threshold, a wireless device may determine that a current time interval is empty. Accordingly, in this region, the wireless device may power off Rx and may not demodulate or decode for the remainder of the time interval in order to save energy. For example, the UE may not decode downlink control information (DCI). It should be appreciated that the UE may consider additional factors in determining that the time interval is empty and powering of Rx. For example, the UE may not power off Rx if the second or third decision metrics are below a weak signal threshold.

Above the second (e.g., LTE) threshold, the first decision metrics may be high. In other words, the UE may detect that the time interval is not empty. For example, an LTE or NR subframe may be detected. Thus, the UE may not power off Rx and may continue to decode and demodulate signals such as DCI.

Between the first and second thresholds may be considered an uncertainty region. In this region, the first decision metric may be too high for the UE to determine an empty time interval with confidence. Accordingly, in order to avoid a false positive (e.g., turning of Rx and failing to receive during a non-empty subframe, thus missing signals transmitted to the UE), the UE may not power off Rx and may continue to decode and demodulate signals such as DCI. In other words, in this region the UE may prioritize performance (e.g., timely reception) over power savings.

In some embodiments, the first and second thresholds may be configured as desired and may further be adjusted over time.

FIG. 7 illustrates one possible mathematical approach for calculating first decision metrics. As shown, $X_m(6k+i)$ may indicate the RSRP (or other measurement) of descrambled a reference signal (e.g., CRS) at symbol 0 (or other symbol, as desired) transmitted from Tx port m at a carrier index $6k+i$. The RS shift for the cell may be represented as i. $N_{prb}$ may refer to the number of physical resource blocks in the bandwidth. Thus, the first term may represent a scalar product with a 6 carrier shift, and the second term may represent a scalar product with a 12 carrier shift. The numerators and denominators of each of these scalar product terms may be summed over the bandwidth (e.g., based on the carrier index, k ranging over the number of PRBs, e.g., 0 to $2N_{prb}-2$ for the first term, and 0 to $2N_{prb}-3$ for the second term). The numerator of the first term may calculate the conjugate of adjacent (e.g., 6 subcarriers apart) and the numerator of the second term may calculate the conjugate of once removed (e.g., 12 subcarriers apart) reference signals. The sum of the scalar product terms may be summed over the number of ports m used for reference signals (e.g., 0 and 1 in the illustrated example). It should be noted that the calculation illustrated in FIG. 7 is exemplary only and that other formulations are possible. For example, different numbers of scalar product terms (e.g., one term for calculating adjacent instances, or more terms for calculating further separated conjugates), different numbers of ports, different subcarrier spacings of reference signals, etc., may be used.

FIG. 8 is a diagram of a physical resource block illustrating the operation of the calculation of FIG. 7 in the case of 2 CRS ports in a subframe. The exemplary bandwidth may include 100 physical resource blocks (e.g., $N_{prb}=100$). As shown, the subframe may include 14 symbols (left to right) and 12 subcarriers (top to bottom). The calculation may be based on CRS detected during symbol 0 (810) on ports 0 and 1. The first scalar product term calculates conjugates of all adjacent instances (e.g., spacing of 6) of CRS on the port. As shown, this term may calculate conjugates for k=0 (subcarrier 1) and k=1 (subcarrier 7), k=1 (subcarrier 7) and k=2 (subcarrier 13), etc. The second iteration (e.g., scalar product term) calculates conjugates for alternating instances (e.g., spacing of 12) of CRS on the port, e.g., for k=0 (subcarrier 1) and k=1 (subcarrier 13), etc. As illustrated, k may range from 0 to 199 (e.g., $2*N_{prb}-2=199$). It should be noted the illustrated arrangement is exemplary only. Other subcarrier spacing, number of ports, number of PRBs, symbols, etc. may be used.

FIGS. 9-10 and Additional Information

FIG. 9 is a table summarizing four exemplary use cases illustrating the operation of the method of FIG. 5 including the timing of powering off Rx as described below.

In a first use case (scenario 1), for example, the current time interval is inside a DMTC window and a downlink (DL) grant was found in the last (e.g., prior) subframe (SF). The UE may attempt to detect DRS after an empty subframe has been preliminarily determined based on CRS. In other words, the UE may attempt to demodulate CRS (e.g., of symbol 0) and measure the RSRP of CRS and may calculate first decision metrics based on CRS. Based on the first decision metrics using CRS in combination with second and third decision metrics (e.g., calculated based on previous subframes), the UE may determine that CRS is not found. After measuring the CRS, the UE may perform various tasks related to the downlink grant from the previous subframe. The UE may also attempt to demodulate DRS (e.g., also of symbol 0), measure RSRP of DRS and may calculate first decision metrics based on DRS. Based on the first decision metrics using DRS in combination with second and third decision metrics (e.g., calculated based on previous subframes), the UE may determine that DRS is not found. Thus, the UE may determine that the subframe is empty. In some embodiments, the UE may power off Rx at symbol 7 and may thus have Rx off for the remaining 7 symbols of the SF, however it should be noted that other timing is possible. This scenario may be viewed as a worst case, e.g., resulting in less power savings than the other illustrated scenarios.

In a second use case (scenario 2), for example, the current time interval is inside a DMTC window and no DL grant was found in the last subframe. The UE may attempt to detect DRS after an empty subframe has been preliminarily determined based on CRS. In other words, the UE may attempt to demodulate CRS (e.g., of symbol 0) and measure the RSRP of CRS and may calculate first decision metrics based on CRS. Based on the first decision metrics using CRS in combination with second and third decision metrics (e.g., calculated based on previous subframes), the UE may determine that CRS is not found. As no DL grant is present, no related tasks may be performed. The UE may also attempt to demodulate DRS (e.g., also of symbol 0), measure RSRP of DRS and may calculate first decision metrics based on DRS. Based on the first decision metrics using DRS in combination with second and third decision metrics (e.g., calculated based on previous subframes), the UE may determine that DRS is not found. Thus, the UE may determine that the subframe is empty. In some embodiments, the UE may power off Rx at symbol 6 and may thus have Rx off for the remaining 8 symbols of the SF, however it should be noted that other timing is possible.

In a third use case (scenario 3), for example, the current time interval is not inside a DMTC window and a downlink grant was found in the last subframe. The UE may not attempt to detect DRS after CRS. In other words, the UE may attempt to demodulate CRS (e.g., of symbol 0) and measure the RSRP of CRS and may calculate first decision metrics based on CRS. Based on the first decision metrics using CRS in combination with second and third decision metrics (e.g., calculated based on previous subframes), the UE may determine that CRS is not found. After measuring the CRS, the UE may perform various tasks related to the downlink grant from the previous subframe. Thus, the UE may determine that the subframe is empty. In some embodiments, the UE may power off Rx at symbol 6 and may thus have Rx off for the remaining 8 symbols of the SF, however it should be noted that other timing is possible.

In a fourth use case (scenario 4), for example, the current time interval is not inside a DMTC window and no downlink grant was found in the last subframe. The UE may not attempt to detect DRS after CRS. In other words, the UE may attempt to demodulate CRS (e.g., of symbol 0) and measure the RSRP of CRS and may calculate first decision metrics based on CRS. Based on the first decision metrics using CRS in combination with second and third decision metrics (e.g., calculated based on previous subframes), the UE may determine that CRS is not found. Thus, the UE may determine that the subframe is empty. In some embodiments, the UE may power off Rx at symbol 5 and may thus have Rx off for the remaining 9 symbols of the SF, however it should be noted that other timing is possible. This may be considered a best case scenario, e.g., resulting in high power savings.

FIG. 10 illustrates another possible mathematical approach for calculating first decision metrics, e.g., similar to FIG. 7. This illustrated formulation may use a single term to calculate conjugates of adjacent instances of reference signals.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
    a radio; and
    a processing element operably coupled to the radio, wherein the processing element is configured to cause the UE to:
        communicate with a first cell of a wireless network;
        perform a plurality of measurements of reference signals of the first cell;
        calculate a first decision metric based on the plurality of measurements, wherein the first decision metric is useable to determine whether a transmission is anticipated during a remainder of a current time interval;
        determine that no transmission is anticipated during the remainder of the current time interval, wherein the determination is based on a comparison of the first decision metric to at least one threshold associated with the first decision metric; and
        power off a receiver of the UE in response to the determination that no transmission is anticipated during the remainder of the current time interval for the remainder of the current time interval.

2. The UE of claim 1, wherein the first cell is a licensed assisted access cell.

3. The UE of claim 1, wherein to calculate the first decision metric, the processing element is further configured to cause the UE to:
    calculate scalar products of adjacent instances of the reference signals of the first cell.

4. The UE of claim 3, wherein to calculate the first decision metric, the processing element is further configured to cause the UE to:
    calculate scalar products of once removed instances of the reference signals of the first cell.

5. The UE of claim 4, wherein to calculate the first decision metric, the processing element is further configured to cause the UE to:
    sum the scalar products of adjacent instances and the scalar products of once removed instances.

6. The UE of claim 5, wherein to calculate the first decision metric, the processing element is further configured to cause the UE to:
    sum the scalar products over a plurality of ports.

7. The UE of claim 5, wherein to calculate the first decision metric, the processing element is further configured to cause the UE to:
    sum the scalar products over a plurality of physical resource blocks, wherein the plurality of physical resource blocks comprises an entire bandwidth used for transmission from the first cell to the UE.

8. An apparatus for managing a user equipment device (UE), the apparatus comprising a processing element configured to cause the UE to:
    perform a plurality of measurements, wherein measurements of the plurality of measurements are performed during a plurality of time intervals, wherein the plurality of time intervals comprises at least one previous time interval and a current time interval;
    calculate a decision metric useable to determine whether a transmission is anticipated during a remainder of the current time interval based on the plurality of measurements;

compare the decision metric to one or more thresholds associated with the decision metric; and in response to the comparison, determine that no transmission is anticipated during the remainder of the current time interval and power off at least one receiver feature of the UE.

9. The apparatus of claim 8, wherein the measurements of the plurality of measurements comprise baseline measurements of the at least one previous time interval, wherein the baseline measurements comprise reference signal received power (RSRP) and signal-noise ratio (SNR).

10. The apparatus of claim 9, wherein the at least one previous time interval comprises at least one non-empty time interval and excludes empty time intervals.

11. The apparatus of claim 9, wherein the measurements of the plurality of measurements further comprise a current interval measurement of the current time interval, wherein the current interval measurement comprises RSRP, wherein the decision metric comprises a first decision metric based on the current interval measurements, wherein the processing element is further configured to cause the UE to calculate:

second decision metrics based on the baseline measurements of SNR, and third decision metrics based on the baseline measurements of RSRP.

12. The apparatus of claim 11, wherein to compare the decision metric to the one or more thresholds, the processing element is further configured to cause the UE to:

compare the first decision metric to a first empty threshold;

compare the second decision metrics to a second weak signal threshold; and compare the third decision metrics to a third weak signal threshold.

13. The apparatus of claim 12, wherein the first decision metric is below the first empty threshold, the second decision metrics are above the second weak signal threshold, and the third decision metrics are above the third weak signal threshold.

14. The apparatus of claim 13, wherein the current time interval collides with a discovery window, wherein the first decision metric comprises first decision metrics based on cell-specific reference signals (CRS) and first decision metrics based on discovery reference signal (DRS), wherein to compare the first decision metric to the first empty threshold, the processing element is further configured to cause the UE to:

compare the first decision metrics based on CRS to the first empty threshold, wherein the first decision metrics based on CRS are below the first empty threshold; and compare the first decision metrics based on DRS to the first empty threshold, wherein the first decision metrics based on DRS are below the first empty threshold.

15. A method, comprising:

by a wireless device:

performing baseline measurements, wherein the baseline measurements are performed during a plurality of time intervals;

performing current interval measurements during a current time interval;

calculating a first decision metric based on the current interval measurements, wherein the first decision metric is useable to determine whether a transmission is anticipated during a remainder of the current time interval;

calculating a second decision metric based on the baseline measurements;

comparing the first decision metric to an empty threshold associated with the first decision metric;

comparing the second decision metric to a weak signal threshold;

determining, based on said comparing the first decision metric to the empty threshold and said comparing the second decision metric to the weak signal threshold, that no transmission is anticipated during the remainder of the current time interval; and powering off at least one receiver component based on the determination that no transmission is anticipated during the remainder of the current time interval.

16. The method of claim 15, the method further comprising:

comparing the first decision metric to a data threshold; and adjusting at least one of the empty threshold and the data threshold.

17. The method of claim 15, wherein the current interval measurements comprise measurements of a discovery reference signal (DRS) and a cell-specific reference signal (CRS), wherein the calculation of the first decision metric assumes that CRS is scrambled based on current subframe information and that DRS is scrambled by a subframe 0 (if the current time interval is a subframe 0-4) or a subframe 5 (if the current time interval is a subframe 5-9).

18. The method of claim 15, wherein the first decision metric is less than the empty threshold, wherein the second decision metric is greater than the weak signal threshold.

19. The method of claim 18, the method further comprising:

powering on the at least one receiver component after the current time interval;

performing subsequent current interval measurements during a subsequent time interval;

calculating a subsequent first decision metric based on the subsequent current interval measurements;

comparing the subsequent first decision metric to the empty threshold;

determining, based on said comparing the subsequent first decision metric to the empty threshold, that a transmission is anticipated during the subsequent time interval; and based on determining that the transmission is anticipated during the subsequent time interval, leaving the at least one receiver component powered on for the subsequent time interval.

20. The method of claim 15, wherein the plurality of time intervals comprise a plurality of subframes of a licensed assisted access cell.

* * * * *